United States Patent [19]

Roy et al.

[11] Patent Number: 5,562,292
[45] Date of Patent: Oct. 8, 1996

[54] SUBMERGIBLE SEAL WITH DIFFUSIVE RADIAL BARRIER

[75] Inventors: Dhirendra C. Roy, Canton; Michael J. Gniewek, Livonia; George Wooldridge, Warren, all of Mich.

[73] Assignee: United Technologies Automotive, Inc., Dearborn, Mich.

[21] Appl. No.: 248,133

[22] Filed: May 24, 1994

[51] Int. Cl.$^6$ .............................. F16J 15/10; H01R 13/73
[52] U.S. Cl. ..................... 277/12; 277/166; 277/212 FB; 439/556
[58] Field of Search .............................. 277/212 FB, 178, 277/12, 166, 189; 439/552, 556, 559, 569, 573; 174/65 G, 152 G

[56] References Cited

U.S. PATENT DOCUMENTS

| | | | |
|---|---|---|---|
| 3,949,217 | 4/1976 | Howe et al. | 439/556 |
| 4,685,173 | 8/1987 | Pavur | 16/2 |
| 4,912,287 | 3/1990 | Ono et al. | 277/212 FB |
| 4,945,193 | 7/1990 | Oikawa et al. | 277/178 |
| 5,104,333 | 4/1992 | Hatagishi et al. | 439/559 |
| 5,249,982 | 10/1993 | Funck et al. | 439/556 |
| 5,279,507 | 1/1994 | Kameyama | 439/552 |

FOREIGN PATENT DOCUMENTS

| | | |
|---|---|---|
| 0580130 | 1/1994 | European Pat. Off. . |
| 2335972 | 7/1977 | France . |
| 2569911 | 3/1986 | France . |

*Primary Examiner*—William A. Cuchlinski, Jr.
*Assistant Examiner*—John L. Beres
*Attorney, Agent, or Firm*—William W. Habelt

[57] ABSTRACT

This invention relates to a seal assembly having a radially diffusive barrier surrounding a compressible combination seal. The combination seal has a radial seal portion and an axial seal portion, providing axial and radial sealing properties as they relate to both diffusive and convective mass flows.

7 Claims, 4 Drawing Sheets

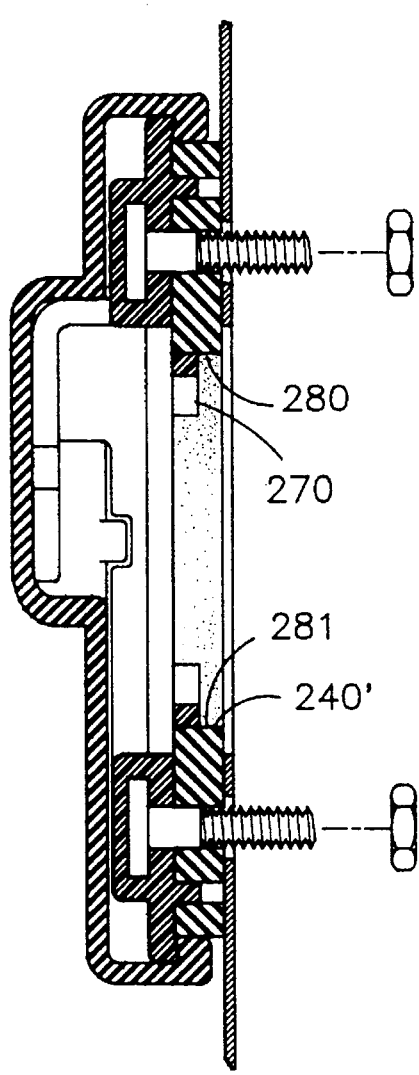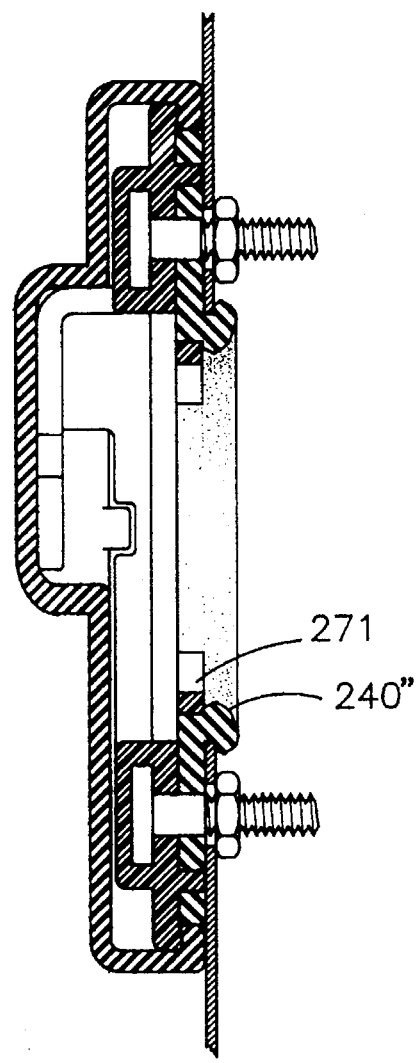

SUBMERGIBLE SEAL WITH DIFFUSIVE RADIAL BARRIER

BACKGROUND OF THE INVENTION

1. Technical Field

This invention relates generally to a seal, and more particularly to a seal suitable for use in situations involving vibration and water vapor.

2. Description of the Related Art

There are, in principle, two types of seals. The first type is called a radial seal, and prevents convective flow perpendicular to the central axis of the hole. A circular disc between two flanges is an example of a radial seal. The second type is called an axial seal, and prevents convective flow parallel to the axis of the hole. An o-ring around a shaft and a cork in a hole are examples of an axial seal.

When designing a seal, there are several factors to consider. One consideration is diffusive mass flow, the other is convective mass flow. Diffusion is caused by a concentration gradient, whereas convection is caused by a pressure gradient. Most conventional seals that deal with diffusion and convection mass flow do not, however, work well in mechanically variable conditions or where the environment has a great deal of water and humidity. Generally, the diffusion of water vapor past a seal cannot be completely stopped, but is rather controlled by the seal design.

Ideally, a seal for use in an automobile should be capable of being fully submerged without permitting any detrimental effect on the product protected by the seal. The seal should also be capable of operating in a dynamic environment, such as where there is sustained vibration. Moreover, to be cost effective, the application surface is often not very smooth, and the seal design should therefore be relatively insensitive to the roughness of the application surface.

SUMMARY OF THE INVENTION

It is therefore an object of the present invention to provide a seal suitable for use in situations where vibration is present, and where there is a strong need to control diffusive flow of water vapor across the seal. The seal is relatively insensitive to the roughness of the application surface. In the preferred embodiment, the seal includes a radially diffusive barrier surrounding a compressible combination seal. The combination seal has a radial seal portion and an axial seal portion. The main advantage of the combination seal is to prevent both diffusive and convective mass flow. For assembly purposes, the combination seal is secured to a carrier. In this regard, one advantage of the present invention is that carrier has screws preformed into it, easing installation.

BRIEF DESCRIPTION OF THE DRAWINGS

Other objects, features and advantages of the present invention may be better appreciated by referring to the following description in conjunction with the drawings in which:

FIG. 8 is a section view of another embodiment of the submergible seal assembly; and FIG. 9 is a section view as in FIG. 8 showing the manner in which the seal is compressed between the carrier and the surface wall.

DESCRIPTION OF THE PRESENTLY PREFERRED EMBODIMENT

Figure 1:
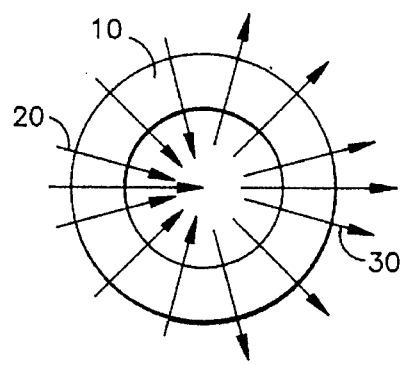
FIG. 1 is an illustration of a radial seal and the characteristics of diffusive flow across the seal.
Figure 2:
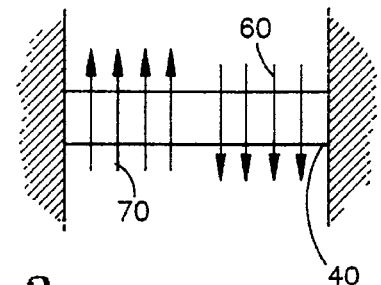
FIG. 2 is an illustration of an axial seal and the characteristics of convective flow across the seal.
Figure 3:
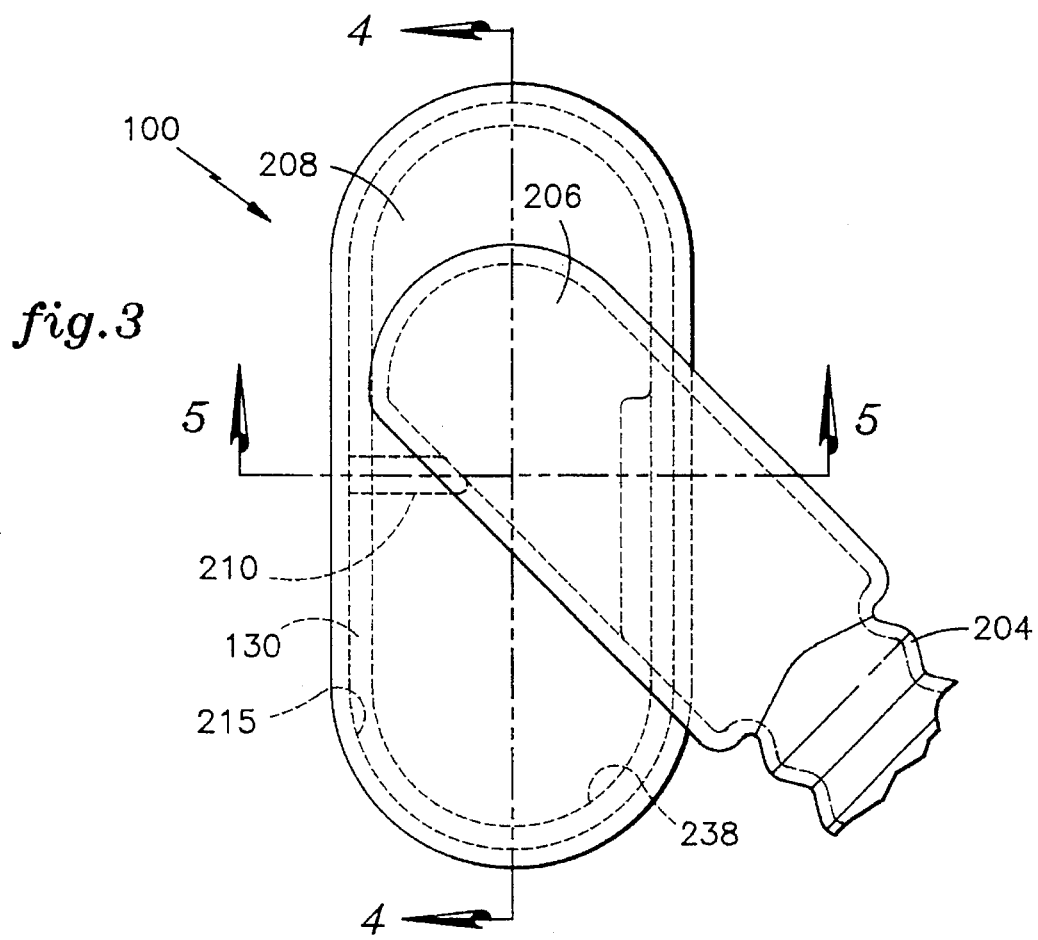
FIG. 3 a top View of the submergible seal assembly of the present invention.

As can be seen by the illustrations of FIGS. 1 and 2, there are two types of mass flows to be concerned with: diffusive and convective. FIG. 1 illustrates the principles of diffusive mass flow across a radial seal 10. Here, as shown by the arrows indicating the direction of mass flow, external substances 20, such as water vapor or air, may infiltrate across the seal. Additionally, internal substances 30 may escape across the seal. FIG. 2 illustrates the principles of convective mass flow across an axial seal 40. Here, as shown by the arrows indicating the direction of mass flow, external substances 60 may infiltrate across the seal barrier, while internal substances 70 may escape out across the seal barrier. Mass flow, particularly diffusive mass flow, occurs to some extent across any seal, but can be reduced by improving several controllable factors, such as the degree to which the surface of the seal mates with the surfaces being sealed, the depth of the barrier as measured from the outside to the inside of the seal, the amount of compressive force on the seal, and the type of seal material used. However, there are several factors which affect seal performance which cannot be readily controlled by the seal design. These factors include vibration, relative movements of the surface being sealed with respect to the seal, rates, and external and internal mass concentrations, and system temperature.

The present invention addresses several of these controllable factors by combining axial and radial seal characteristics into a single seal assembly. As shown in FIGS. 3 through 7, the present invention is preferably expressed as a seal assembly employing a boot 100 and a combination seal 110. The combination seal 110 is mounted to a carrier 120, and the carrier 120 is secured within the boot 100 by a circumferential lip 130. The carrier 120 has two preset threaded shanks 140, 141 which secure the seal assembly to the surface being sealed 110. When secured to the surface being sealed, the combination seal 110 is slightly compressed, and the boot 100 is pulled flush with the surface. More particularly, the seal assembly of the present invention is designed for use in an automobile having a hatchback tailgate. The seal assembly is referred to as a lift gate grommet by those of ordinary skill in the art. In use, the lift gate grommet encloses the lift gate wire harness, and is designed to protect the wire harness from infiltration by water and debris.

The wire harness boot 100 is formed from a flexible rubber compound, and is designed to house the wires and seal about the opening 200 in the surface of the lift gate wall 150. The boot 100 includes a tubular portion 204 which leads to an offset raised portion 206 at the top 208 of the boot 100. Because the opening 200 is rectangular, the boot 100 is oval shaped. Due to the manner in which the tail gate is assembled and the manner in which the wire harness must be routed, the raised portion 206 is offset at an approximate 45 degree angle with respect to the boot 100. The wire harness (not shown), when housed by the seal assembly, travel through the tubular portion 204, are flexed in a right angle fashion as they pass through the raised portion 206, then pass out from the boot 100 and into the opening 200 in the wall 150.

The boot 100 includes a key 210 formed along the inside 212 of the top 208 of the boot 100. The key 210 engages a mating key way 214 in the carrier 120 to aid in its proper alignment within the boot 100 and to prevent shifting. The carrier 120, like the boot 100, is oval shaped, and fits between the lip 130 of the boot 100 and the inside 212 of the top 208 of the boot 100, and is circumferentially similar in size to the circumferential size of the vertical wall portion 215 of the boot 100 above the lip 130 and below the top 208. It is formed from injection molded plastic, and the shanks 140, 141 are actually metal screws with the heads of the screws embedded in the injection molded plastic. The carrier 120 also includes a cantilevered support beam 216 which fits within the raised portion 206 of the boot 100, and helps support that raised portion 206. Since the wire harness must turn to route from the tubular portion 204 to pass through the boot 100 and into the opening 200, the wire harness is vulnerable to damage if the raised portion 206 were to be accidentally crushed. Therefore, the support beam 216 on the carrier 120 serves to protect the wires from damage as well as supporting the raised portion 206. It is important to note that the support beam 216 is angled 218 to match the angle of the offset of the raised portion 206. The support beam 216 also includes two notches 219, 220 which allow a tie strap (not shown) to be wrapped around the wire harness and secured in position with respect to the support beam 216. The tie strap simply rests within the notches when wrapped around the support beam 216 and wire harness. Tying the wire harness to the support beam 216 helps secure the position of the wire harness with respect to the seal assembly.

Figure 4:
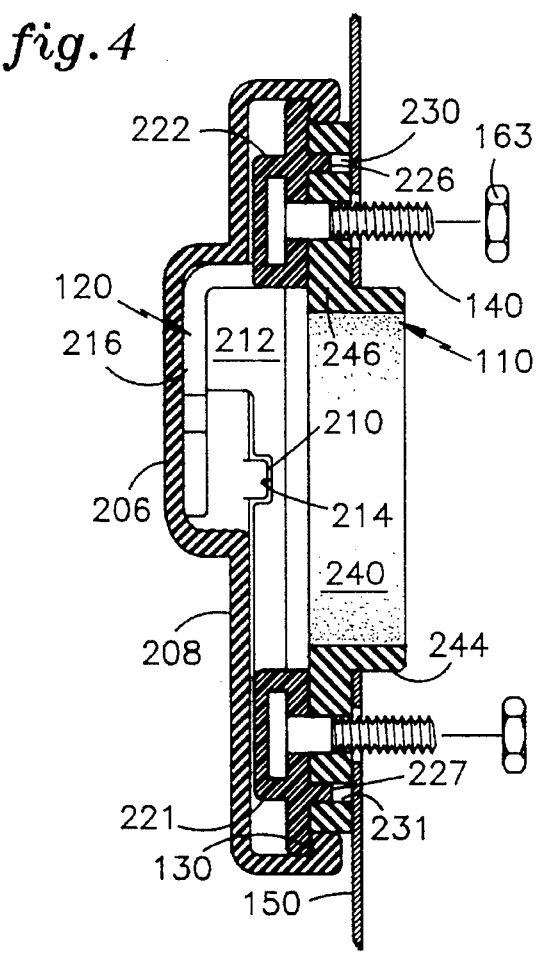
FIGS. 4 and 5 are section views of the submergible seal assembly.
Figure 5:
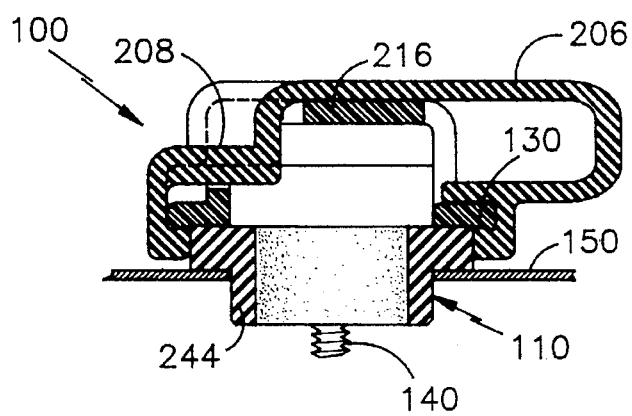
Figure 6:
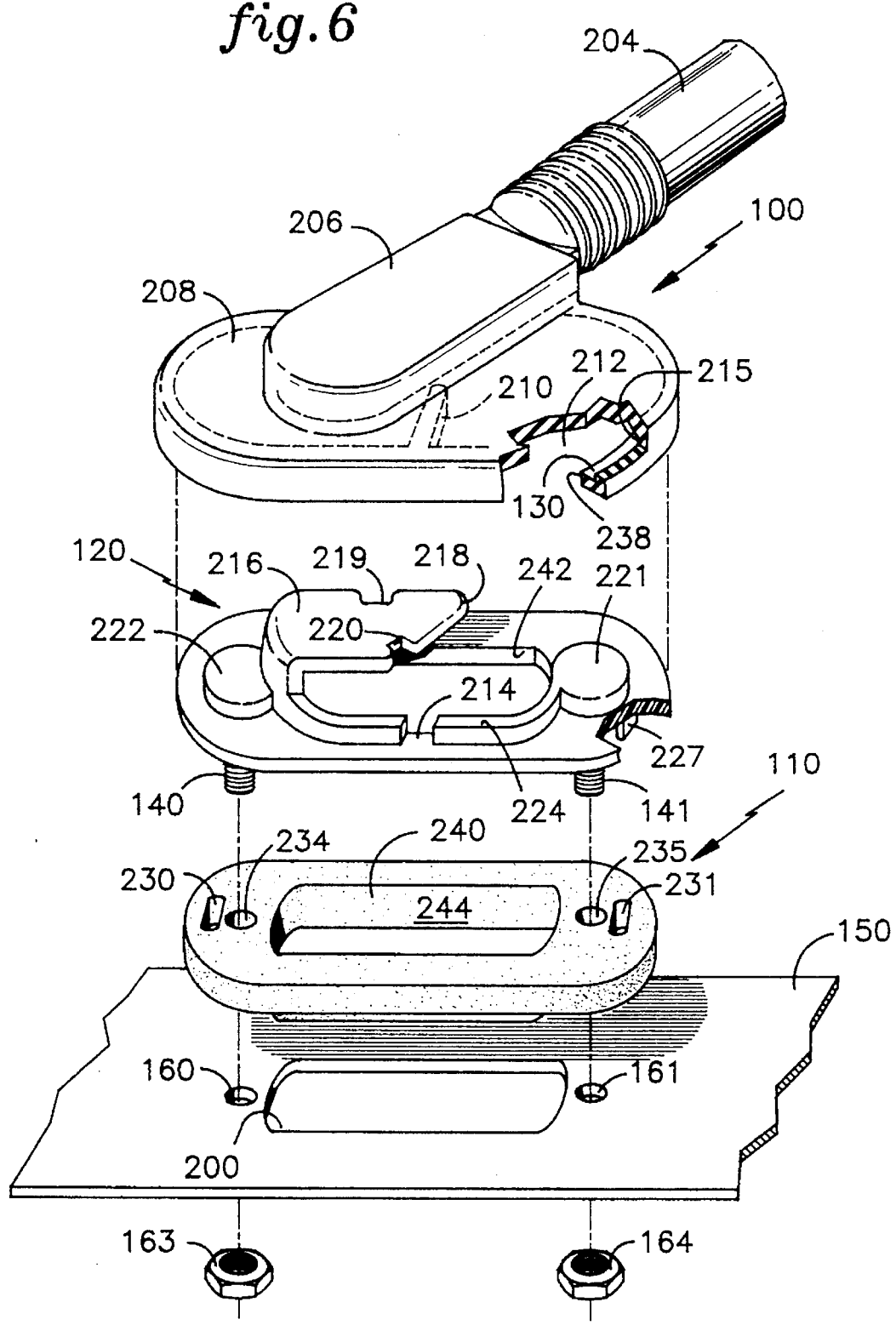
FIG. 6 is an exploded view showing the various components of the submergible seal assembly.

The threaded shanks 140, 141, as stated earlier, are molded into the carrier 120, and the carrier 120 has raised shank backings 221,222 and a raised ridge 224 which rest along the inside 212 of the top 208 of the boot 100. The carrier 120 also includes two short legs 226, 227 which serve to prevent over tightening of the carrier 120 against the wall 150. As can be best seen in FIG. 4, the short legs 226, 227 are approximately half the thickness of the combination seal 110 in length. Referring generally to FIGS. 4 through 6, the combination seal 110 has two corresponding clearance holes 230, 231 which receive the short legs 226, 227 of the carrier 120, and has two shank holes 234, 235 which receive the threaded shanks 140, 141.

The combination seal 110 is made from a porous elastomer material, such as silicon rubber, and is designed to be compressed between the carrier 120 and the wall surface 150 when the seal assembly is snugged. The combination seal 110 is oval-shaped, like the carrier 120 and boot 100, and is circumferentially similar in size to the circumferential size of the inner edge 238 of the boot lip 130. The combination seal 110 has an opening 240, which essentially corresponds to the opening 242 in the carrier 120. As can again be seen best in FIG. 4, the combination seal 110 has a tubular lip portion 244 which extends from the combination seal opening 240 and lies flush within the opening 200 in the surface wall 150. In this configuration, the combination seal 110 provides both radial and axial sealing properties. The body 246 of the seal 110 is a diffusive barrier against the radial flow. The body 246 which rests against the surface wall 150, serves also as a radial seal to prevent convective mass flow between the surface wall 150 and the seal 110, while the tubular lip portion 244, which contacts the opening 200 in the surface wall 150, serves as an axial seal to prevent both diffusive and convective mass flow across the opening 200. As can be better seen in FIG. 7, the threaded shanks 140,141 are inserted through corresponding screw holes 260, 261 in the surface wall 150, and nuts 163, 164 are tightened on the threaded shanks 140, 141. The short legs 226, 227 of the carrier 120 prevent excessive overtravel caused by overtightening, yet still allow the carrier 120 to be snugged against the surface wall 150 just enough to compress the combination seal 110 between the carrier 120 and the surface wall 150.

Figure 7:
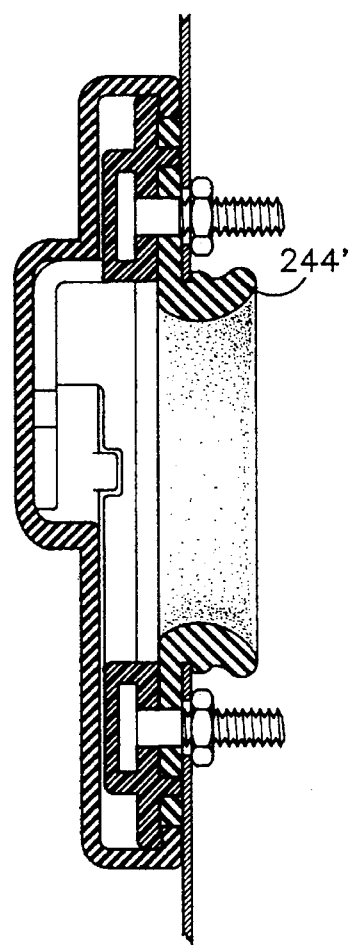
FIG. 7 is a section view as in FIG. 4 showing the manner in which the seal is compressed between the carrier and the surface wall.

The compression of the combination seal 110 results in slight deformation of the seal tubular lip portion 244' about the wall opening 200, as shown in FIG. 7. This deformation has no detrimental effect on the axial sealing characteristics of the combination seal 110, and, in fact, actually helps improve the axial sealing mechanism. The tubular lip 244' will, by design, remain preloaded at the opening 200 of the surface wall 150. The compression of the combination seal 110 also helps improve the radial sealing characteristics of the seal by pressing the body 246 of the seal 110 snugly against the surface wall 150. Also, once the seal assembly is thus tightened, the boot lip 130 lies snugly flush against the surface wall 150, creating a second radial sealing barrier.

Once installed, the seal assembly represents three seals in series—the boot 100 acts as a first radial barrier, the body 246 of the combination seal 110 acts as a second radial barrier, and the tubular lip portion 244 of the combination seal 110 acts as an axial barrier. As assembled and mounted, the deformation of the combination seal 110 as it is compressed between the carrier 120 and the surface wall 150 is constrained about the outer circumference of the seal 110 by the boot lip 130. Also, when properly snugged against the surface wall 150, the boot lip 130 will be bottomed out against the surface wall 150 without any air gap between the lip 130 and surface wall 150. However, it can be appreciated that, in a dynamic situation, which is common in automotive applications, flexing and vibrational movement of the boot 100 could cause a pressure drop across the seal barrier, and may also result in slight temporary air gaps between the surface wall 150 and the boot lip 130. When this occurs, water will be able to pass past the first radial barrier. However, the radial barrier created by the compressed combination seal 110 is not susceptible to such temporary lapses in performance, and thus remains an effective barrier to infiltration by water.

An alternative embodiment, not requiring the seal tubular lip 244, is shown in FIGS. 8 and 9. Here, the combination seal 110 has no tubular lip, and instead the opening 240' is slightly larger than the opening 200 in the surface wall 150. The carrier 120 also further includes a pair of partial circumferential lips 270, 271 that rest along the opposing lateral edges 280, 281 of the seal 110. These partial circumferential lips 270, 271 help to control the deformation of the combination seal 110 as it is compressed between the carrier 120 and the surface wall 150, as shown in FIG. 9. Here, it can be seen that the combination seal 110 deforms about the wall opening 200, causing the seal 110 to partially extend into and over the wall opening 200. As was the case earlier, the short legs 226, 227 prevent overtightening, and the boot lip 130 lies flush against the surface wall 150. Thus, while the combination seal of FIGS. 8 and 9 does not per se have a tubular lip like the combination seal of FIGS. 4, 5, 6 and 7, it can be appreciated that once compressed the combination seal 110 of FIGS. 8 and 9 exhibits both axial and radial sealing characteristics. However, the axial sealing characteristics of the tubular-lip-less combination seal 110 are not as robust as that of a combination seal with a tubular lip. As can be appreciated from the preceding discussion of the two embodiments, it is within the skill of an ordinary user to determine what degree of radial seal integrity is needed for any particular application. Thus, for an application requiring more robust axial sealing, the combination seal shown in FIGS. 4 through 7 would likely be needed, while a less stringent application may be well served by the tubular-lip-less combination seal of FIGS. 8 and 9.

One of ordinary skill in the art can appreciate that the preceding discussion was provided for the purposes of illustrating the invention, and that any number of modifications could be effected without departing from the spirit or scope of the invention disclosed here.

We claim:

1. A seal assembly for protecting a wire harness from infiltration by water and debris where the wire harness enters a passageway defined by an opening passing through a surface of an automobile body, said seal assembly comprising:

a sealing boot having a top portion, a tubular portion extending from a first side of the top portion for receiving the wire harness, and a circumferential lip depending from a second side of the top portion, said sealing boot defining a first radial barrier acting to inhibit diffusive and convective mass flow;

a compressible sealing member having an opening corresponding essentially to the opening passing through the surface in the automobile body and body portion extending circumferentially about said opening, the body portion having an outboard circumferental surface abutting and being surrounded by the circumferential lip of said sealing boot, said compressible sealing member defining a second radial barrier acting to inhibit diffusive and convective mass flow; and a rigid carrier member supported by said sealing boot and supporting said compressible sealing member, said rigid carrier member adapted for mounting to the surface whereby said compressible sealing member is compressed in sealing relationship between the carrier member and the surface about the opening passing through the surface, and whereby a portion of said compressible sealing member extends into the passageway defined by the opening passing through the surface thereby defining an axial barrier seal.

2. A seal assembly as recited in claim 1 wherein the circumferential lip of said sealing boot supports said rigid carrier member within said sealing boot.

3. A seal assembly as recited in claim 2 wherein said carrier member includes threaded member extending outward therefrom for mounting said carrier member to the surface.

4. A seal assembly as recited in claim 3 wherein said carrier member is formed of molded plastic and each of the threaded members has a head embedded in the molded plastic and a threaded shank extending outwardly from its head.

5. A seal assembly as recited in claim 3 wherein the body portion of said compressible sealing member has a plurality of receiving holes passing therethrough, each of the receving holes adapted to receive a corresponding one of the threaded members of said carrier member.

6. A seal assembly as recited in claim 5 wherein said compressible sealing member further comprises a tubular lip portion extending outwardly from the body portion of said compressible sealing member and defining the opening in said compressible sealing member.

7. A seal assembly for protecting a wire harness from infiltration by water and debris where the wire harness enters a passageway defined by an opening passing through a surface of an automobile body, said seal assembly comprising:

a sealing boot having a top portion, a tubular portion extending from a first side of the top portion for receiving the wire harness, and a circumferential lip depending from a second side of the top portion, said circumferential lip having a sealing face adapted to contact the surface in sealing relationship, said sealing boot defining a first radial barrier acting to inhibit diffusive and convective mass flow;

a compressible sealing member having a body portion and a tubular lip portion defining an opening in the body portion and extending outwardly from the body portion of said compressible sealing member, the tubular lip portion adapted to extend into the opening passing through the surface in the automobile body, the body portion of said compressible sealing member extending circumferentially about the tubular lip portion and having an outboard circumferential surface abutting and being surrounded by said circumferential lip of said sealing boot, said compressible sealing member defining a second radial barrier an axial barrier acting to inhibit diffusive and convective mass flow; and a rigid carrier member supported by said sealing boot and supporting said compressible sealing member, said rigid carrier member adapted for mounting to the surface whereby said compressible sealing member is compressed in sealing relationship between the carrier member and the surface about the opening passing through the surface with the tubular lip portion of said compressible sealing member extending into the passageway defined by the opening passing through the surface and establishing a sealing relationship about the passageway.

* * * * *